(12) United States Patent
Skinlo et al.

(10) Patent No.: US 8,053,107 B1
(45) Date of Patent: Nov. 8, 2011

(54) FEEDTHROUGH ASSEMBLY WITH COMPRESSION COLLAR

(75) Inventors: David M. Skinlo, Valencia, CA (US); Hisashi Tsukamoto, Santa Clarita, CA (US)

(73) Assignee: Quallion LLC, Sylmar, CA (US)

( * ) Notice: Subject to any disclaimer, the term of this patent is extended or adjusted under 35 U.S.C. 154(b) by 2135 days.

(21) Appl. No.: 11/076,650

(22) Filed: Mar. 10, 2005

Related U.S. Application Data

(60) Provisional application No. 60/552,416, filed on Mar. 11, 2004.

(51) Int. Cl.
*H01M 2/00* (2006.01)
*H01M 2/02* (2006.01)
*H01M 2/08* (2006.01)

(52) U.S. Cl. ........ 429/180; 429/163; 429/178; 429/181; 429/183

(58) Field of Classification Search .................. 429/171, 429/172, 180, 181, 183, 185
See application file for complete search history.

(56) References Cited

U.S. PATENT DOCUMENTS

| | | | | |
|---|---|---|---|---|
| 4,166,158 A | * | 8/1979 | Mead et al. | 429/181 |
| 5,811,206 A | * | 9/1998 | Sunderland et al. | 429/181 |
| 5,926,357 A | | 7/1999 | Elias et al. | |

* cited by examiner

*Primary Examiner* — Barbara Gilliam
*Assistant Examiner* — Steven Scully
(74) *Attorney, Agent, or Firm* — Gavrilovich Dodd & Lindsey LLP

(57) ABSTRACT

The feedthrough assembly includes an insulating sleeve positioned between a ferrule and a pin such that the ferrule is electrically insulated from the pin. The feedthrough assembly also includes a compression collar compressing the ferrule and insulating sleeve against the pin. The compression can be sufficient to form a seal between the ferrule and the insulating sleeve and/or between the insulating sleeve and the pin.

27 Claims, 4 Drawing Sheets

Figure 1A                    Figure 1B

FEEDTHROUGH ASSEMBLY WITH COMPRESSION COLLAR

REFERENCE TO PRIOR FILED APPLICATIONS

This application claims the benefit of U.S. Provisional Patent Application Ser. No. 60/552,416, filed on Mar. 11, 2004, entitled "Compression Seal with Annular Tension Ring" and incorporated herein in its entirety.

TECHNICAL FIELD

This invention relates generally to energy storage devices, and more particularly, to energy storage devices that employ a feedthrough assembly.

BACKGROUND

A variety of batteries are used in applications where it is desirable to reduce the weight of the battery. A large portion of the weight for batteries is often found in the casing. As a result, it would be desirable to make the battery casing of low density materials such as aluminum.

Batteries often use one or more feedthrough assemblies that each act as a terminal for the battery. A feedthrough assembly is positioned in a hole through the case. These feedthrough assemblies often includes a collar that compresses the components inside the feedthrough assembly. The compression can prevent liquid from leaking out of the hole through the feedthrough assembly.

The collar of the feedthrough assembly is often attached to the case of the battery. To enable welding, the collar must be made of aluminum when the case is made of aluminum. However, aluminum and other low density materials are generally soft and can deform over time. This deformation causes the level of compression provided by the collar to decrease and permits liquid in the case to leak through the feedthrough assembly. As a result, there is a need for a feedthrough assembly that can be use with low density case materials.

SUMMARY

A feedthrough assembly for use with an energy storage device is disclosed. The feedthrough assembly includes an insulating sleeve positioned between a ferrule and a pin such that the ferrule is electrically insulated from the pin. The feedthrough assembly also includes a compression collar compressing the ferrule and insulating sleeve against the pin. The compression can be sufficient to form a seal between the ferrule and the insulating sleeve and/or between the insulating sleeve and the pin. In some instances, the feedthrough assembly consists of or consists essentially of the insulating sleeve, ferrule, pin and compression collar A method of forming the feedthrough assembly is also disclosed. The method includes generating a feedthrough assembly precursor having an insulating sleeve positioned between a ferrule and a pin such that the ferrule is electrically insulated from the pin. The method also includes positioning a compression collar on the feedthrough assembly precursor such that the compression collar compresses the ferrule and insulating sleeve against the pin. The compression can be sufficient to form a seal between the ferrule and the insulating sleeve and/or between the insulating sleeve and the pin.

Energy storage devices include one or more of the feedthrough assemblies and methods of forming the energy storage devices are also disclosed. In some instances, the energy storage devices are a battery.

BRIEF DESCRIPTION OF THE DRAWINGS

FIG. 1A is a cross section of the feedthrough assembly taken along a plane parallel to longitudinal axis of the feedthrough assembly. The feedthrough assembly includes an insulating sleeve between a ferrule and a pin. The feedthrough assembly also includes a compression collar compressing the ferrule.

FIG. 1B is a perspective view of a cross section of the feedthrough assembly taken along a plane parallel to longitudinal axis of the feedthrough assembly.

DETAILED DESCRIPTION

A feedthrough assembly for connecting to one or more electrodes in a battery is disclosed. The feedthrough assembly includes an insulating sleeve positioned between a ferrule and a pin such that the ferrule is electrically insulated from the pin. The feedthrough assembly also includes a compression collar compressing the ferrule and insulating sleeve against the pin.

In some instances, the ferrule is connected to the case of an energy storage device with the pin extending into the case through a hole in the case. The connection between the ferrule and the case can be constructed such that a first seal is formed between the ferrule and the case. Additionally, the compression of the ferrule and the insulating sleeve provided by the compression collar can be sufficient to form a second seal between the ferrule and the insulating sleeve and/or a third seal between the insulating sleeve and the pin. The first seal, the second seal, and the third seal can act together to prevent liquids in the battery case from leaking through the hole.

In some instances, the compression collar is not affirmatively attached to the case. As a result, the compression collar can be constructed from a material that is different from the case. For instance, the case can be constructed of a low density material such as aluminum and the compression collar can be constructed from a higher density material such as stainless steel. The ferrule can be constructed of the same low density material as the case to permit welding of the ferrule to the case. However, because the high density materials of the compression collar can be harder than the low lower density materials of the case and ferrule, the compression collar can suppress deformation of the low density ferrule. Because the ferrule does not deform over time, the integrity of the seal(s) within the feedthrough assembly are retained over time. As a result, the feedthrough assembly is suitable for use with low density case materials.

The feedthrough assembly can be constructed such that the compression provided by the compression collar is sufficient to retain the integrity of the second seal, and the third seal at room temperature, at body temperatures (37° C.) and/or at higher temperatures. As a result, the feedthrough assembly is suitable for most applications including medical devices.

Figure 1:
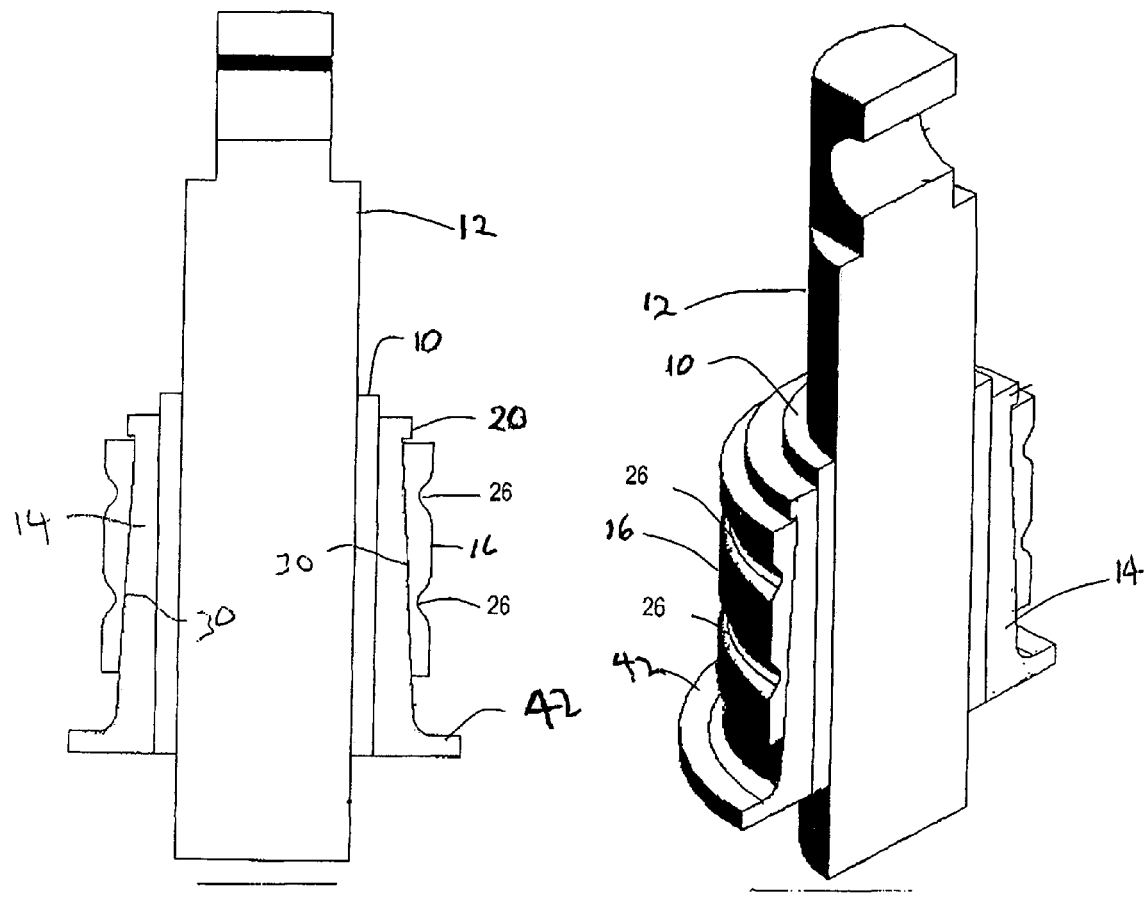
FIG. 1A and FIG. 1B illustrate a feedthrough assembly.

FIG. 1A and FIG. 1B illustrate a feedthrough assembly. FIG. 1A is a cross section of the feedthrough assembly taken along a plane parallel to longitudinal axis of the feedthrough assembly. FIG. 1B is a perspective view of a cross section of the feedthrough assembly taken along a plane parallel to longitudinal axis of the feedthrough assembly. The feedthrough assembly includes an insulating sleeve 10 between a pin and a ferrule 14. A compression collar 16 is positioned on the ferrule 14. The compression collar 16 can compress the ferrule 14 toward with the pin with sufficient force to also compress the insulating sleeve 10 toward the pin. The compression can be sufficient to form a second seal between the ferrule 14 and the insulating sleeve 10 and/or a third seal between the insulating sleeve 10 and the pin. The compression can be sufficient for the second seal and the third seal to be impermeable to liquids.

The insulating sleeve 10 is positioned on the pin 12 and preferably surrounds the pin 12. As a result, the insulating sleeve 10 can electrically insulate the ferrule 14 from the pin 12. The insulating sleeve 10 is preferably continuous. For instance, the insulating sleeve 10 can be an annulus, hollow cylinder, or a ring that surrounds the pin 12. The insulating sleeve 10 can be discontinuous. For instance, the insulating sleeve 10 can have an open C shape. In some instances, the C shape closes upon assembly of the feedthrough assembly. The closure of the insulating sleeve 10 causes the insulating sleeve 10 to surround the pin 12. Suitable materials for the insulating sleeve 10 include, but are not limited to, DuPont Tefzel® ethylene tetrafluoroethylene modified copolymer (ETFE).

The ferrule 14 is positioned on the insulating sleeve 10 and preferably surrounds the insulting sleeve 10. All or a portion of the ferrule 14 that is interfaced with the sleeve can have a shape that is complementary to the external side of the insulating sleeve 10 to encourage substantially uniform compression of the insulating sleeve 10. The ferrule 14 is preferably continuous. For instance, the ferrule 14 can be an annulus, hollow cylinder, or a ring that surrounds the insulating sleeve 10. Alternately, the ferrule 14 can be discontinuous. For instance, the ferrule 14 can have an open C shape that closes upon assembly of the feedthrough assembly. The closure of the ferrule 14 can cause the ferrule 14 to surround the pin 12.

As noted above, the compression collar can retain the shape and integrity of the ferrule. As a result, the ferrule can be constructed of materials that would normally have a high tendency to deform over time. For instance, suitable materials for the ferrule include, but are not limited to, materials having a tensile strength less than 434 MPa (mega Pascal) at room temperature. Specific examples include, but are not limited to, aluminum, and more preferably 3000 series aluminum. Additionally, the ferrule can have a construction that would normally have a high tendency to deform over time. For instance, the ferrule wall can have one or more regions with a thickness less than 0.5 mm, 0.3 mm or 0.2 mm; the entire ferrule wall can have a thickness less than 0.5 mm, 0.3 mm or 0.2 mm; and/or the portion of the ferrule wall adjacent to the compression collar can have a thickness less than 0.5 mm, 0.3 mm or 0.2 mm. In some instances, the entire ferrule wall is thicker than 0.5 mm.

The compression collar 16 is positioned on the ferrule 14 and preferably surrounds the ferrule 14. All or a portion of the compression collar 16 that is interfaced with the ferrule can have a shape that is complementary to the external side of the ferrule 14 to encourage substantially uniform compression of the ferrule 14. The compression collar 16 is preferably continuous. For instance, the compression collar 16 can be an annulus, hollow cylinder, or a ring that surrounds the insulating sleeve 10. Alternately, the compression collar 16 can be discontinuous. For instance, the compression collar 16 can have an open C shape. In some instances, the C shape closes upon assembly of the feedthrough assembly. The closure of the compression collar 16 can cause the compression collar 16 to surround the pin 12. Suitable materials for the ferrule include, but are not limited to, aluminum, and more preferably 3000 series aluminum. The compression collar 16 is preferably made of stainless steel, and more preferably of 300 series stainless steel.

When used in a battery, the feedthrough assembly can be in electrical communication with one or more anodes in the case of the battery or with one or more cathodes in the case of the battery. When the feedthrough assembly is in electrical communication with one or more anodes, the pin 12 can include or consists of titanium. When the feedthrough assembly is in electrical communication with one or more cathodes, the pin 12 can include or consist of aluminum. Some alternative pin materials include, but are not limited to, copper, stainless steel, nickel, and nickel plated steel.

The feedthrough assembly can include one or more retention structures configured to prevent the compression collar 16 from slipping over the top of the ferrule 14. For instance, the ferrule 14 can include a flange 20 positioned above the compression collar 16 as is evident in FIG. 1A. The outer diameter of the flange 20 can be larger than the inner diameter of the compression collar 16 to prevent the compression collar 16 from slipping over the ferrule 14. The flange 20 can be continuous or broken along the entire upper edge of the compression collar 16 or along a portion of the upper edge of the compression collar 16.

Figure 2:
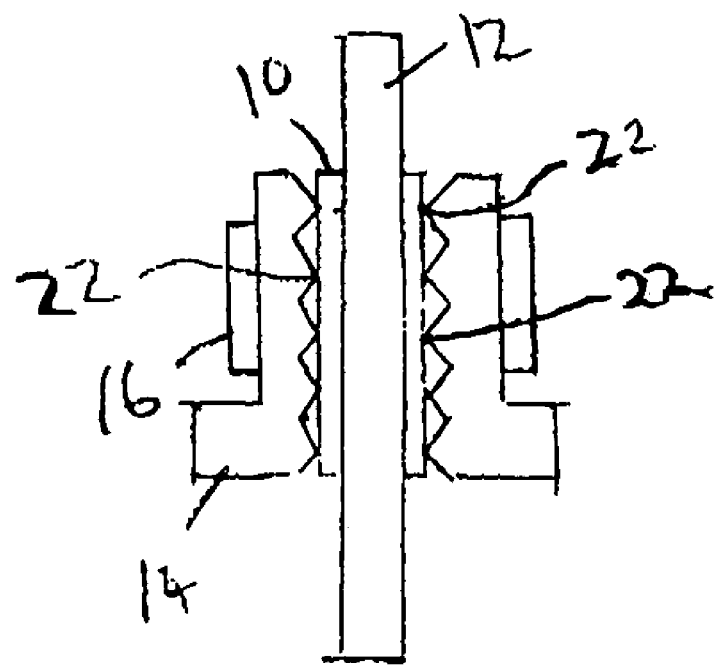
FIG. 2 is a cross section of the feedthrough assembly taken along a plane parallel to longitudinal axis of the feedthrough assembly. An interior side of the ferrule includes teeth for gripping an exterior side of the insulating sleeve.

The feedthrough assembly can include one or more gripping structures configured to immobilize components in the feedthrough assembly relative to one another. For instance, the ferrule 14 and/or the insulating sleeve 10 can include gripping structures configured to enhance immobilization of the ferrule 14 relative to the insulating sleeve 10. Examples of gripping structures include, but are not limited to, teeth, bumps and/or threads. FIG. 2 is a cross section of a feedthrough assembly where an interior side of the ferrule 14 includes teeth 22 for gripping an exterior side of the insulating sleeve 10. In another example, an interior side of the ferrule 14 and an exterior side of the insulating sleeve 10 include complementary threads that allow the ferrule 14 to be threaded or screwed onto the insulating sleeve 10.

The feedthrough assembly can be generated by positioning the insulating sleeve 10 on the pin 12. The ferrule 14 is then placed on the insulating sleeve 10 and the compression collar 16 is placed on the ferrule 14. The above steps can be performed in different sequences. For instance, the compression collar 16 can be placed on the ferrule 14 and the combination can be placed on the insulating sleeve 10. Alternately, the ferrule 14 can be placed on the insulating sleeve 10 and the combination can be placed on the pin 12. Further, the compression collar 16 can be placed on the ferrule 14 and the ferrule 14 placed on the insulating sleeve 10 and the combination placed on the pin 12.

In some instances, the ferrule 14 is constructed so as to slide freely over the insulating sleeve 10. In these instances, the compression collar 16 can be the only or primary source of compressive force on the insulating sleeve 10. Additionally, the insulating sleeve 10 can optionally be constructed so as to slide freely over the pin 12. When the ferrule 14 is configured to slide freely over the insulating sleeve 10 and the insulating sleeve 10 is configured to slide freely over the pin 12, the compression collar 16 may be the only or primary source of compressive force in the feedthrough assembly.

The compression provided by the compression collar 16 can be formed before or after the assembly of the feedthrough assembly. For instance, the compression collar 16 can be placed on the feedthrough assembly in the desired location and the compression collar 16 can be crimped onto the ferrule 14. In some instances, the compression collar 16 includes one or more regions of weakness that encourage the formation of crimps in the desired locations. For instance, the compression collar 16 can include one or more recesses 26 as is evident in FIG. 1A and FIG. 1B. The illustrated recesses can surround the compression collar 16 or extend part way around the compression collar 16. As a result, these recesses can be employed to apply a crimp around the perimeter of the compression collar 16. When crimping is employed to form the compression and the ferrule 14 includes a retention structure such as a flange, the compression collar 16 can be sized so as to fit over the retention structure before crimping but not after crimping.

In another example, the compression is generated by heating the compression collar 16 to expand it to a size that allows it to be placed over the ferrule 14 and then allowing the compression collar 16 to cool and contract against the ferrule 14. The compression collar 16 is sized such that the compression of the ferrule 14 is retained at the desired operating temperature for the battery. In some instances, the compression collar 16 is sized such that the desired level of compression is retained at room temperature and/or at body temperature. In some instances, the compression collar 16 is also crimped after placing the compression collar 16 on the feedthrough assembly in order to provide additional compression and/or to reduce the effects of temperature fluctuation on the integrity of the compression. When the ferrule 14 includes a retention structure such as a flange 20, the compression collar can be heated to a size that allows the compression collar 16 to be lowered over the retention structure.

In another example, the compression is generated using press fit technologies. For instance, all or a portion of the ferrule that is interfaced with the compression collar can be sloped 30 relative to a longitudinal axis of the feedthrough assembly. The slope can be structured such that the compression of the ferrule 14 increases as the collar is slid further onto the ferrule 14. Alternately, all or a portion of the ferrule interface portion of the compression collar's internal side can be sloped relative to a longitudinal axis of the feedthrough assembly. The slope of the compression collar 16 can be structured such that the compression of the ferrule 14 increases as the collar is slid further onto the ferrule 14. In some instances, the collar interface portion of the ferrule 14 and the ferrule interface portion of the compression collar 16 are both sloped relative to the longitudinal axis of the feedthrough assembly as illustrated in FIG. 1A and FIG. 1B. The slopes are structured such that compression of the ferrule 14 increases as the collar is slid further onto the ferrule 14.

The above techniques for forming the compression can be combined. For instance, the press fit technologies can be combined with crimping and/or with heating and cooling of the compression collar 16.

Figure 3:
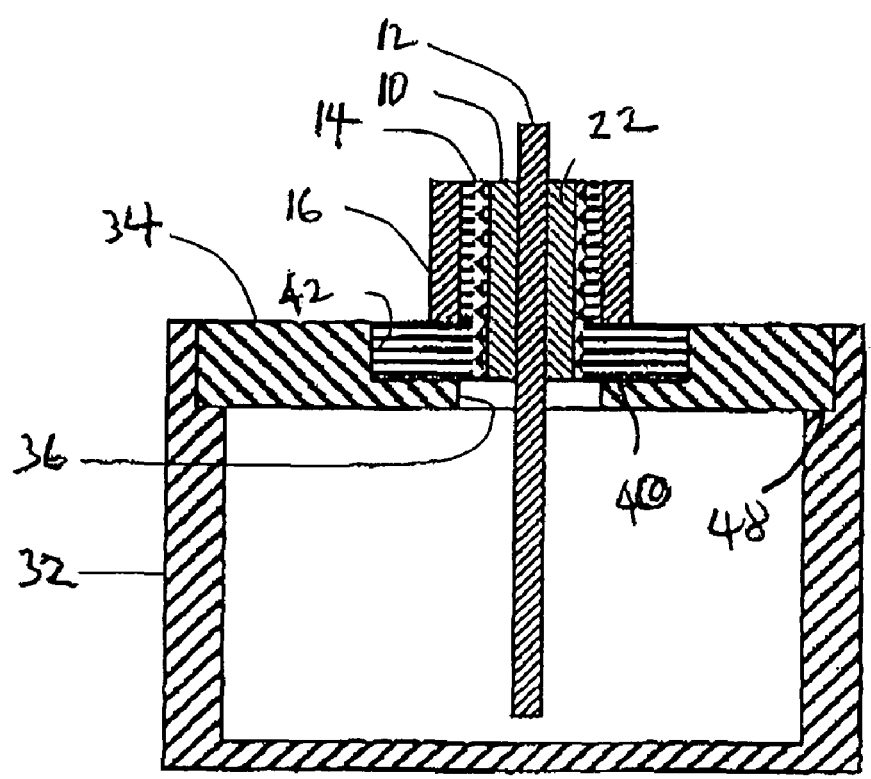
FIG. 3 is a cross section of an energy storage device having a case that includes a cover positioned on a body. A feedthrough assembly is attached to the cover with the pin extending through a hole in the cover.

FIG. 3 is a cross section of a battery that includes the feedthrough assembly of FIG. 2. The battery can be a variety of different types including, but not limited to, a wound type battery, jelly role, stacked, prismatic, coin cell, etc. The battery includes a case with a body 32 and a cover 34. In some instances, the body and/or the cover are constructed of low density materials. For instance, suitable materials for the body and/or the cover include, but are not limited to, materials having a tensile strength less than 434 MPa (mega Pascal) at room temperature. In some instances, the case is made of thin conductive materials such as a metal or metal alloy. Preferably, the case is made of aluminum such as 3000 series aluminum. The feedthrough assembly is attached to the cover 34 with the pin 12 extending through a hole 36 in the cover 34. Although not illustrated, the pin 12 is in electrical communication with one or more anodes in the battery case or with one or more cathodes in the battery case. The body and/or the cover of the case can include or consist of materials with a lower tensile strength than the compression collar. For instance, a suitable ratio for the tensile strength of the compression collar:tensile strength of the body and/or the cover includes, but is not limited to ratios greater than 1:1, or 1.1:1 or 1.2:1.

In some instances, the ferrule 14 is attached to the cover 34 such that a first seal is formed between the ferrule 14 and the cover 34. The first seal, the second seal, and the third seal can act together to prevent leakage of liquid through the hole 36. In some instances, the hermeticity of these seals can be enhanced by covering the sealed components with epoxy or the like. A suitable method for forming the first seal includes, but is not limited to, laser welding. Laser welding can prevent light from penetrating through the hole 36 in the cover 34.

Because the first seal can be formed between the ferrule 14 and the cover 34, the compression collar 16 and/or the insulating sleeve 10 need not be affirmatively attached to the cover 34 or even contact the cover 34. In this structure, the pin 12 is electrically insulated from the cover 34, ferrule 14, and compression collar 16.

The hole 36 can have one or more supports that support the feedthrough structure. For instance, the sides of the hole 36 can have one or more non-vertical features such as slopes, tapers and steps. As an example, the hole 36 illustrated in FIG. 3 includes a counterbore that results in a step 40 being formed in the hole 36. The counterbore can be formed by punching or machining. The counterbore can be sized such that the ferrule 14 fits against the inner surfaces of the counterbore. In some instances, the bottom edge of the ferrule 14 includes a flange 42 configured to be received within the hole 36 as is evident in FIG. 3. The step 40 can support the feedthrough assembly and/or the ferrule 14 during the formation of the first seal. For instance, the step 40 can support the feedthrough assembly during welding of the ferrule 14 to the cover 34. Additionally, the step 40 can reduce or prevent the entry of light into the case during the formation of the first seal.

While FIG. 3 shows the insulating sleeve 10, ferrule 14, and compression collar 16 to be aligned at the top and bottom edges, and FIG. 1A through FIG. 1B show the insulating sleeve 10 aligned with ferrule 14 at the bottom edge but extending above the ferrule 14 at the top edge, other configurations are possible. For example, the insulating sleeve 10 may extend into hole 36 of the cover 34 and may even extend beneath cover 34 deeper into the case. In another example, the upper edge of the ferrule 14 may extend above, instead of being aligned with or below, the insulating sleeve 10.

Figure 4:
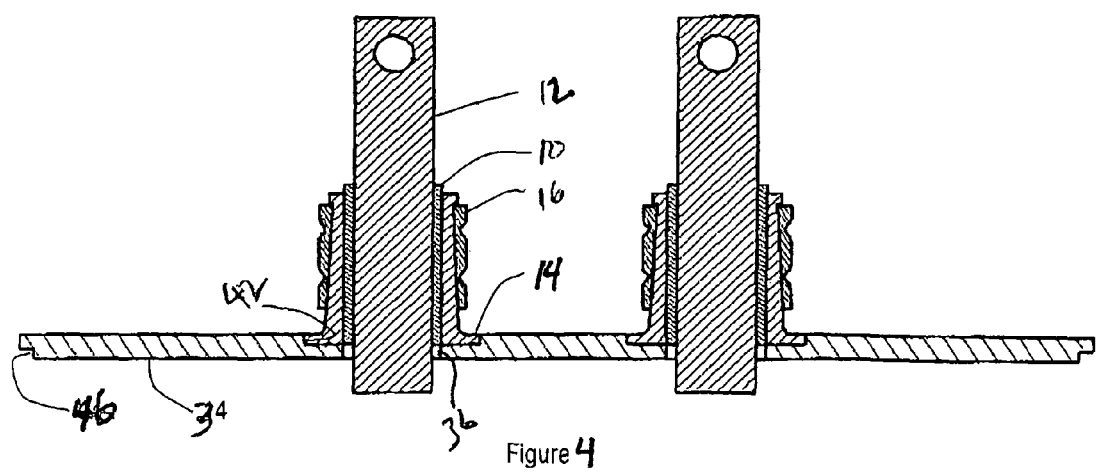
FIG. 4 is a cross section of a cover for an energy storage device. A plurality of feedthrough assemblies are attached to the cover.

The cover 34 can include a plurality of feedthrough assemblies as illustrated in FIG. 4. When the cover 34 is employed with a battery, one of the feedthrough assemblies can be in electrical communication with one or more anodes in the battery and the other feedthrough assembly can be in electrical communication with one or more cathodes in the battery. Although the feedthrough assemblies are shown as having the same structure, the feedthrough assemblies can have different structures. The embodiment of the cover 34 illustrated in FIG. 3 is suitable for battery embodiments where the case acts as one terminal for a battery and the pin 12 acts as the other terminal. The embodiment of the cover 34 illustrated in FIG. 4 is suitable for batteries that use a plurality of terminals.

The edges of the cover 34 can include one or more non-vertical features. For instance, the edge of the cover 34 can include slopes and/or steps. As an example, the cover 34 can optionally include a step 46 as shown in FIG. 4. The step 46 allows the cover 34 to rest on the body 32 of the case during attachment of the cover 34 to the body 32. Attachment of the cover 34 to the body 32 can include laser welding of the cover 34 to the body. The laser can applied from the side direction and the step feature can block the laser light from entering the interior of the case. Additionally or alternately, the upper edge of the body 32 can include non horizontal features. For instance, the upper edge of the body 32 can include one or more tapers and/or one or more steps. As an example, FIG. 3 illustrates the upper edge of the body 32 having a step 48. The step permits the cover 34 to rest the on body 32 of the case during attachment of the cover 34 to the body 32. Attachment of the cover 34 to the body 32 can include laser welding of the cover 34 to the body 32. The laser can applied from above the battery and the step feature can block the laser light from entering the interior of the case. Other case-to-cover configurations can be used with the feedthrough assembly.

In addition to the hole(s) for the feedthrough(s), the cover can include a fill hole (not illustrated) for filling the case with an electrolyte solution and a fill plug (not illustrated) that closes the fill hole. The fill plug may be disk-shaped and is preferably made of the same material as the cover. The fill hole may be straight or may have a counterbore. The cover may have a symmetrical shape. In some instances, the hole and the fill hole are located symmetrically with respect to the cover and have identical shapes and sizes. This arrangement can allow the holes to be used interchangeably during assembly, simplifying assembly procedures. The fill plug can be fixed to the cover, preferably by laser welding between the circumference of the fill plug and the inside surface of the fill hole. A counterbore in the fill hole can aid in laser welding by preventing laser light from passing through to the inside of the battery case during welding. The cover preferably includes a pressure vent.

Although the pin 12, insulating sleeve 10, ferrule 14, and compression collar 16 are shown above as having a round cross sectional shape, one or more of these components can have an interior and/or exterior with a different cross sectional shape such an oval, square, rectangular, or prismatic.

Although the battery and feedthrough assembly, cover and case are disclosed in the context of a battery, the feedthrough assembly, cover and/or case can be applied to other energy storage devices and/or electrochemical devices such as capacitors and/or hybrid cattery/capacitors.

Although the insulating sleeve 10 is disclosed as being positioned between the ferrule 14 and the pin 12, other components can optionally be positioned between the ferrule 14 and the pin 12. Additionally or alternately, the insulating sleeve 10 can have a multi-layer construction.

It will be apparent to those skilled in the art that various modification and variations can be made in the electrical storage battery of the present invention without departing from the spirit or scope of the invention. Thus, it is intended that the present invention cover modifications and variations that come within the scope of the appended claims and their equivalents.

What is claimed is:
1. An energy storage device, comprising:
an insulating sleeve positioned between a ferrule and a pin such that the ferrule is electrically insulated from the pin; and
a compression collar compressing the ferrule and insulating sleeve against the pin so as to seal the space between the pin and the ferrule to passage of liquids.

2. The device of claim 1, wherein the density of the compression collar is higher than the density of the ferrule.

3. The device of claim 1, wherein the tensile strength of the compression collar is higher than the tensile strength of the ferrule.

4. The device of claim 3, wherein the ferrule has a tensile strength less than 434 MPa (mega Pascal) at room temperature.

5. The device of claim 1, wherein the compression collar surrounds the ferrule.

6. The device of claim 1, wherein:
the compression collar is metal and is electrically coupled to the ferrule.

7. The device of claim 1, wherein, the compression collar includes stainless steel.

8. The device of claim 1, wherein the ferrule includes aluminum.

9. The device of claim 1, wherein the ferrule has an inner surface adjacent to the insulating sleeve, the inner surface including gripping features configured to reduce movement of the ferrule relative to the insulating sleeve.

10. The device of claim 1, further comprising:
an electrode assembly positioned within a case, the electrode assembly including one or more first polarity electrodes and one or more second polarity electrodes, wherein at least one of the first polarity electrodes is in electrical communication with the pin; and
a cover covering an opening in the case and including a hole extending through the cover, the pin extending through the hole.

11. The device of claim 10, wherein the case is aluminum.

12. The device of claim 10, wherein at least one of the second polarity electrodes is electrically connected to the case such that the case forms a second terminal of the energy storage device.

13. The device of claim 10, wherein the hole has a counterbore.

14. The device of claim 1, wherein an interior side of the compression collar adjacent to the ferrule is sloped relative to a longitudinal axis of the feedthrough assembly.

15. The device of claim 1, wherein an exterior side of the ferrule adjacent to the compression collar is sloped relative to a longitudinal axis of the feedthrough assembly.

16. The device of claim 1, wherein the ferrule includes a flange configured to retain the compression collar in a position on the ferrule, the flange being located at an end of the ferrule which is furthest from the electrode assembly.

17. The device of claim 1, wherein a recess for crimping the compression collar extends at least part way around the perimeter of the compression collar.

18. The device of claim 1, wherein a recess for crimping the compression collar extends at least 50% of the way around the perimeter of the compression collar.

19. A feedthrough assembly for use with an energy storage device, comprising:
an insulating sleeve positioned between a ferrule and a pin such that the ferrule is electrically insulated from the pin; and
a compression collar compressing the ferrule and insulating sleeve against the pin so as to form a seal.

20. A method of fabricating a feedthrough assembly, comprising:

providing a feedthrough assembly precursor having an insulating sleeve positioned between a ferrule and a pin such that the ferrule is electrically insulated from the pin; and positioning a compression collar on the feedthrough assembly precursor such that the compression collar compresses the ferrule and insulating sleeve against the pin so as to form a seal.

21. The method of claim 20, wherein positioning the compression collar on the feedthrough assembly precursor includes crimping the compression collar onto the feedthrough assembly precursor.

22. The method of claim 20, wherein positioning the compression collar on the feedthrough assembly precursor includes reducing a temperature of the compression collar after positioning the compression collar on the feedthrough assembly.

23. The method of claim 22, further comprising: elevating the temperature of the compression collar before positioning the compression collar on the feedthrough assembly precursor.

24. The method of claim 20, wherein positioning the compression collar on the feedthrough assembly precursor includes press fitting the compression collar onto the ferrule, and wherein an interior side of the compression collar adjacent to the ferrule is sloped relative to a longitudinal axis of the feedthrough assembly.

25. The method of claim 20, wherein positioning the compression collar on the feedthrough assembly precursor includes press fitting the compression collar onto the ferrule, and wherein an exterior side of the ferrule adjacent to the compression collar is sloped relative to a longitudinal axis of the feedthrough assembly.

26. The device of claim 1, wherein the pin extends through a case and the compression collar does not contact the case.

27. The device of claim 1, wherein the pin extends through a case and the compression collar is positioned entirely outside of the case and does not contact the case.

* * * * *